United States Patent

Milazzo

[15] 3,638,779
[45] Feb. 1, 1972

[54] CONVEYOR
[72] Inventor: Carl J. Milazzo, Tonawanda, N.Y.
[73] Assignee: Hohl Machine & Conveyor Co., Inc., Buffalo, N.Y.
[22] Filed: June 27, 1969
[21] Appl. No.: 837,118

[52] U.S. Cl. ...........................................198/127
[51] Int. Cl. .............................................B65g 13/02
[58] Field of Search ..........................198/127, 160

[56]     References Cited

UNITED STATES PATENTS

| 2,253,198 | 8/1941 | Regan | 198/127 |
| 3,040,872 | 6/1962 | Hohl | 198/127 |
| 3,127,003 | 3/1964 | Goepper et al. | 198/127 |
| 3,266,617 | 8/1966 | Forsyth et al. | 198/127 |

Primary Examiner—Richard E. Aegerter
Attorney—Christel & Bean

[57]     ABSTRACT

An accumulating transfer conveyor comprising a series of live rollers driven by an endless drive member having one side in frictional contact with said rollers adjacent one end thereof. A pair of pads are secured to the other side of the endless drive member at equally spaced-apart distances. As the pads move along with the drive member, they engage detent means which snub the pads and the underlying drive member radially against the rollers to increase the frictional contact between the endless drive member and the rollers.

7 Claims, 5 Drawing Figures

PATENTED FEB 1 1972 3,638,779
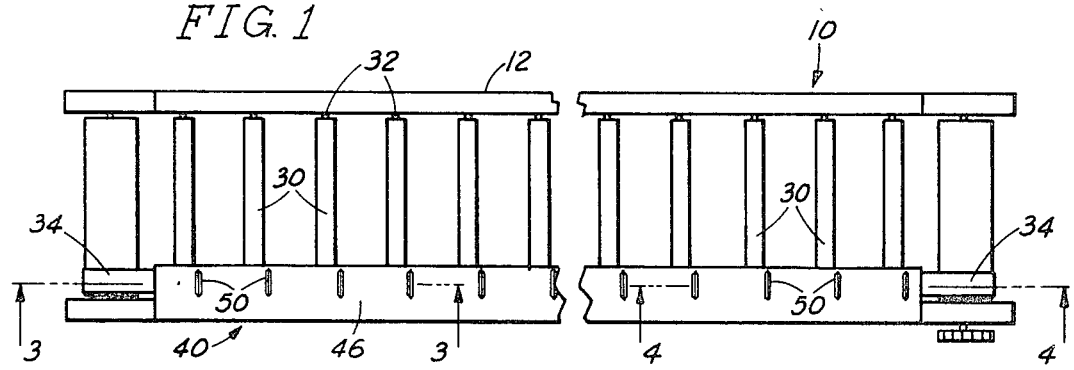
FIG. 1
FIG. 2
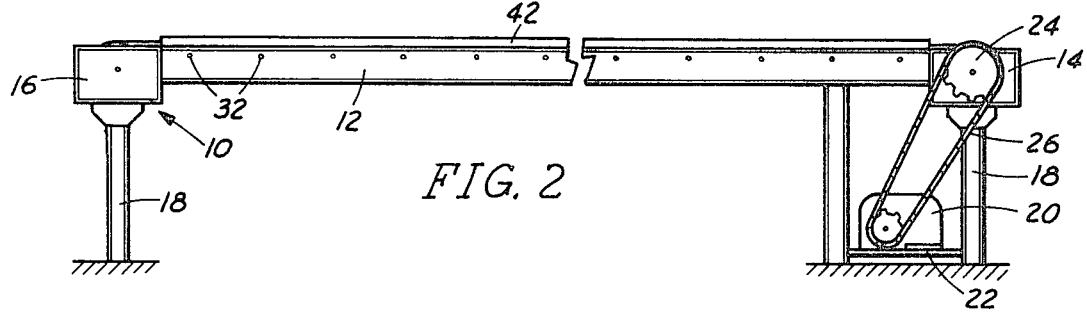
FIG. 3
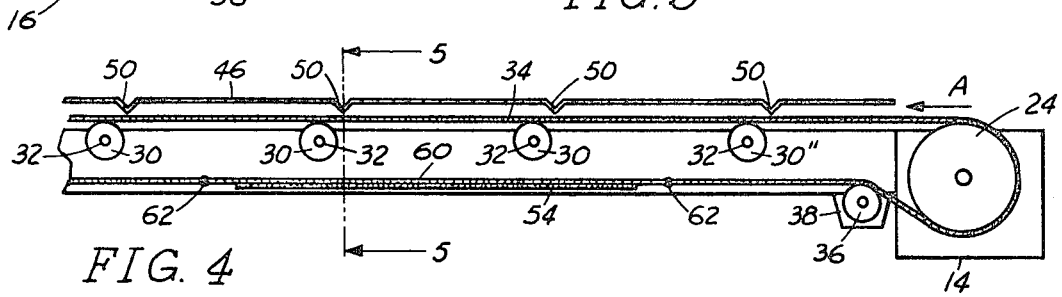
FIG. 4
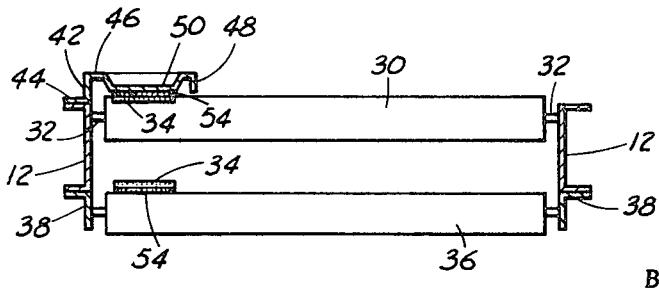
FIG. 5
INVENTOR.
CARL J. MILAZZO
BY
Christel & Bean
ATTORNEYS

CONVEYOR

BACKGROUND OF THE INVENTION

This invention relates generally to the conveyor art, and more specifically to a new and useful accumulating and transfer conveyor of the live-roller type.

In conventional conveyors of the live-roller type, it is known to drive the rollers by an endless belt maintained in frictional engagement with either the under surfaces or the upper surfaces of the rollers. In the latter case, since only a portion of the upper surfaces of the rollers can be frictionally engaged by a belt to allow room for the loads to be conveyed, weight members are sometimes superposed on the endless belt to press the latter against the rollers to increase the frictional engagement of the endless belt with the rollers. Such arrangements have the disadvantage that a constant friction force is produced along the length of the conveyor, requiring a relatively large holdback force for accumulation with the resulting possibility of damage to the products being accumulated. Where the endless belt engages the under surfaces of the rollers, a pad is sometimes used in conjunction with the belt. However, the pad moves in a direction opposite that of the product, whereby the load is only indexed a short distance commensurate with the length of the pad.

SUMMARY OF THE INVENTION

A primary object of the present invention is to provide an accumulating conveyor of the belt-driven, live-roller type requiring only a minimum of holdback force for accumulation of the product being conveyed.

The apparatus of the present invention, as hereinafter described, obviates the above disadvantages by providing an improved conveyor of the live-roller type which comprises an endless drive member of sufficient weight normally to maintain the forward motion of the product being conveyed, and which includes means for increasing the frictional engagement of the endless drive member with successive rollers sufficient to initiate movement of a load along the conveyor.

The accumulating transfer conveyor of the present invention is characterized by the provision of pads secured to an endless drive member at spaced distances from each other and detent means for engaging the padded portions of the endless drive member to increase the frictional engagement of the endless drive member with the live rollers.

Various other novel features of construction and advantages inherent in the conveyor construction of the present invention are pointed out in the following detailed description of an illustrative embodiment thereof considered in conjunction with the accompanying drawing depicting the same wherein like numerals represent like parts through the various views.

BRIEF DESCRIPTION OF THE DRAWING FIGURES

FIG. 1 is a top plan view of an accumulating transfer conveyor of the present invention with parts broken away for ease of illustration;

FIG. 2 is a side elevational view of the conveyor shown in FIG. 1;

FIG. 3 is an enlarged, longitudinal sectional view thereof taken about on line 3—3 of FIG. 1;

FIG. 4 is a view like that of FIG. 3, but taken along 4—4 of FIG. 1; and

FIG. 5 is a vertical sectional view taken about on line 5—5 of FIG. 4.

DESCRIPTION OF THE PREFERRED EMBODIMENT

Referring now to the drawing in detail, there is shown an accumulating transfer conveyor of the present invention comprising a supporting frame, generally designated 10, having opposite side rails 12 of generally channel-shaped cross section. End frame members 14 and 16 are secured at opposite ends of side rails 12 and are supported by legs 18. A drive motor 20, carried on a base 22 is connected to drive pulley 24 by means of a chain drive 26. Drive pulley 24 is suitably journaled for rotation in end frame member 14 and an idler pulley 28 is journaled for rotation in opposite frame member 16.

A series of rollers 30 having stub shafts 32 at opposite ends thereof are suitably journaled for rotation in side rails 12. Rollers 30 are rotated by drive means which comprise an endless drive belt, generally designated 34, trained about drive pulley 24 and idler pulley 28 and guided for movement in an irregular orbital path. Belt 34 is supported on its return run by rollers 36 journaled at their opposite ends in brackets 38 secured to frame side rails 12.

Drive belt 34 is substantially enclosed in its active run by a cover, generally designated 40, having a sidewall 42 with an outwardly extending flange 44 suitably secured to one of the legs of side rail 12 (see FIG. 5), a top wall 46 extending across the width of belt 40 and a depending flange 48 strengthening and substantially completing the enclosure. Top wall 46 is provided with a series of transverse depressions or channel detents 50 corresponding in number to the number of rollers 30 and oriented generally parallel thereto Detents 50 are located slightly forwardly or upstream of their associated rollers 30 relative to the advancing or active run of belt 34, and are for a purpose which will become apparent.

Drive belt 34 extends along the upper surfaces of one end only of rollers 30, as shown in FIGS. 1 and 5, and presents to rollers 30 a friction surface having a relatively high coefficient of friction sufficient to maintain rotation of rollers 30 to convey articles disposed thereon under normal operating conditions. Endless belt 34 is formed of any suitable material, such as woven cotton for example, the important feature being that the roller-engaging side of belt 34 is coated with polyvinyl chloride to substantially increase the coefficient of friction thereof and increase its roller rotating ability. However, the friction force applied to rollers 30 by belt 34 preferably is not of a magnitude to initiate rotation of rollers 30 and overcome the inertia of a static load disposed thereon or to convey loads under abnormal conditions, such as loads which might be oriented askew to the rollers or where a pileup occurs. In other words, the weight of belt 34 and resulting friction force on rollers 30 is selected so as to be sufficient to maintain forward motion of articles being conveyed but generally insufficient to overcome the inertia of static loads on the rollers. In this way, only a minimum of holdback force is required for product accumulation.

A significant feature of this invention is the provision of means to increase the frictional engagement of drive belt 34 with rollers 30 and cause rollers 30 to convey very heavy and abnormal loads and to initiate rotation of rollers 30 with static loads disposed thereon, without however unduly increasing the holdback force required for accumulation. Such means are in the form of a pair of elongated fabric pads 54 secured to endless drive belt 34 on the side opposite the roller engaging friction surface. Pads 54 are equally spaced-apart on belt 34 with one of the pads 54 being located in the active or conveying run of belt 34 while the other pad is positioned in the return of belt 34 during its movement in an orbital path. As the trailing edge of leading pad 54 passes the left end roller 30', as seen in FIG. 3, the leading edge of trailing pad 54 engages the right end roller 30" so that at all times at least a portion of one of the pads 54 is engaging at least one live roller 30. Although two pads are preferable, it should be realized that the principles of this invention contemplate the use of only one, or more than two pads, if desired.

Pad 54 can be formed of the same material as belt 34, such as woven cotton for example, and can have the same thickness as belt 34 to substantially double the effective thickness of belt 34 at the padded portions thereof. Of course, the thickness and length of pad 54 can vary, as desired. The padded portion of the belt can be separately fabricated and spliced or secured to belt 34 as shown at 56 in FIG. 3, or pads 54 can be otherwise fixedly secured to belt 34 by any suitable means. The padded portion of belt 34 will hereinafter be referred to as thick portion 60 and the nonpadded portion as thin portion 62.

In operation, endless drive belt 34 is driven in an orbital path in the direction of arrows A by means of motor 20, chain drive 26 and drive pulley 24. Thin portion 62 of belt 34 easily clears detents 50 and engages the upper surfaces of rollers 30 to maintain them rotating under normal conditions, the frictional engagement of thin portion 62 on rollers 30 being sufficient normally to maintain forward motion of the product being conveyed. When a thick portion 60 encounters detent 50, it is deflected downwardly to press belt 34 against roller 30, thereby engaging a larger surface area of roller 30 and increasing the frictional engagement of belt 34 with roller 30. Thus, snubbing of the padded portion of drive belt 34 against rollers 30 by detents 50 causes a greater driving force to be imparted to rollers 30 sufficient to initiate rotation thereof when a stationary load is disposed thereon. The load (not shown) will be carried continuously along the entire length of the conveyor, the drive force imparted by the unpadded belt portions being sufficient to accomplish this with normal loads. Even abnormally heavy loads will be carried along by successive rollers 30 as they are engaged by thick portion 60 which is snubbed thereagainst by the associated detents 50, such thick portion 60 traveling alongside the load. The load can be removed at the left end of the conveyor or can be accumulated by providing stop means (not shown) on the left end of the conveyor allowing slippage between rollers 30 and the accumulated load. Once rollers 30 are rotating, the weight and frictional force of thin portion 62 of belt 34 is sufficient to continue to drive rollers 30 and convey the load carried thereby under normal operating conditions. In exceptional situations, such as in the event of a load pileup or accumulation somewhere along the conveyor or if a load is improperly placed on the conveyor, thin portion 62 of belt 34 might not be effective to maintain rollers 30 rotating. However, the situation will be obviated as soon as thick portion 60 of belt 34 contacts the motionless rollers. Padded portions 60 act as agitators, providing the starting force needed to motivate stationary loads.

Thus, it is seen that the present invention provides a novel and simple accumulating transfer conveyor for advancing loads in an efficient manner requiring only a minimum holdback force for accumulation. By the provision of pads secured to the backside of an endless drive belt in conjunction with detent means, the frictional engagement of the belt with the rollers is materially increased to insure conveyance of heavier loads under both normal and abnormal conditions. Detents 50 engage pads 54 ahead or forward of the associated roller and snub belt 34 thereagainst to increase the drive force on the rollers without resort to weights. The detents present a relatively small area engaged by the belt, and therefore impart little frictional resistance to the drive. The pad force is limited to a very few of the total number of rollers, whereby a relatively small holdback force will suffice for accumulation notwithstanding a relatively large pad force. As a result, the likelihood of product damage during accumulation is significantly reduced.

A preferred embodiment of this invention having been described and illustrated, it is to be understood that this has been done by way of illustration only.

What I claim is:

1. A conveyor comprising: a supporting frame; a series of article-conveying live rollers journaled on said frame; an endless drive member having one side in frictional contact with surface portions of said rollers adjacent one end thereof for rotating the same; the frictional contact between said drive member and said rollers being sufficient normally to maintain forward motion of articles being conveyed and being generally insufficient to overcome the inertia of static loads on said rollers; means for driving said endless drive member in an orbital path; at least one pad secured to the other side of said endless drive member; and means above said drive member for deflecting said pad and said endless drive member against said rollers to increase the frictional contact between said drive member and said rollers.

2. A conveyor according to claim 1 wherein two pads are secured to said other side of said endless drive member at equally spaced distances therealong.

3. A conveyor according to claim 1 wherein said deflecting means is located in the path of movement of said pad as it advances with said endless drive member.

4. A conveyor according to claim 1 wherein said deflecting means are spaced above and disposed upstream of each live roller.

5. A conveyor comprising: a supporting frame; a series of live rollers journaled on said frame; an endless drive member having one side in frictional contact with surface portions of said rollers adjacent one end thereof for rotating the same; means for driving said endless drive member in an orbital path; at least one pad secured to the other side of said endless drive member; and means for deflecting said pad and said endless drive member against said rollers to increase the frictional contact between said drive member and said rollers; and said deflecting means include a channel detent extending generally parallel to the axis of its associated roller and transversely of the path of movement of said endless drive member.

6. A conveyor according to claim 5, together with a cover substantially enclosing the drive flight of said drive member, there being a channel detent associated with each of said rollers, said detents being provided in said cover.

7. A conveyor comprising: a supporting frame; a series of live rollers journaled on said frame; an endless drive member having one side in frictional contact with surface portions of said rollers adjacent one end thereof for rotating the same; means for driving said endless drive member in an orbital path; at least one pad secured to the other side of said endless drive member; and means for deflecting said pad and said endless drive member against said rollers to increase the frictional contact between said drive member and said rollers; and said deflecting means includes a plurality of detents associated one with each of said rollers, said detents being spaced above and upstream of their associated rollers, said pads being engaged by said detents for snubbing said drive member against the associated rollers, said drive member otherwise passing freely by said detents.

* * * * *